United States Patent
Araujo Da Silva et al.

(10) Patent No.: US 7,442,733 B2
(45) Date of Patent: Oct. 28, 2008

(54) RUBBER COMPOSITION COMPRISING A CITRACONIMIDOMALEIMIDE

(75) Inventors: José Carlos Araujo Da Silva, Pont-du-Chateau (FR); Laure Belin, Riom (FR); Christiane Blanchard, Chateaugay (FR)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 0 days.

(21) Appl. No.: 11/374,978

(22) Filed: Mar. 15, 2006

(65) Prior Publication Data

US 2006/0247342 A1    Nov. 2, 2006

Related U.S. Application Data

(63) Continuation of application No. PCT/EP2004/010253, filed on Sep. 14, 2004.

(30) Foreign Application Priority Data

Sep. 15, 2003    (FR) .................................. 03 10820

(51) Int. Cl.
*C08K 5/34* (2006.01)
(52) U.S. Cl. ...................................... 524/105; 524/571
(58) Field of Classification Search ................. 524/105, 524/571
See application file for complete search history.

(56) References Cited

U.S. PATENT DOCUMENTS

| 5,503,904 A | 4/1996 | Yoshinaga et al. |
| 6,326,438 B1 | 12/2001 | D'Sidocky et al. |
| 6,350,492 B1 | 2/2002 | Gillick et al. |

FOREIGN PATENT DOCUMENTS

| EP | 0823453 A | 2/1998 |
| WO | WO 93/23467 A | 11/1993 |

*Primary Examiner*—Peter D Mulcahy
(74) *Attorney, Agent, or Firm*—Buchanan Ingersoll & Rooney PC

(57) ABSTRACT

A rubber composition, usable for the manufacture of tires, is based on at least one diene elastomer, reinforcing filler, vulcanization system and, as anti-reversion agent, a citraconimidomaleimide compound of the formula (R=hydrocarbon radical):

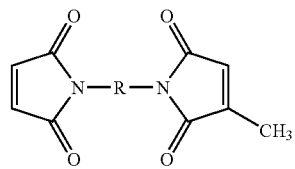

The composition may be used for the manufacture of a finished article or a semi-finished product made of rubber intended for a ground contact system of an automobile, in particular of a tire.

32 Claims, 2 Drawing Sheets

RUBBER COMPOSITION COMPRISING A CITRACONIMIDOMALEIMIDE

CROSS REFERENCE TO RELATED APPLICATIONS

This application is a continuation of International Application No. PCT/EP2004/010253, filed Sep. 14, 2004, published Mar. 24, 2005, in French, as WO 2005/026250, and claims priority based on French Application No. 0310820, filed Sep. 15, 2003, the disclosures of both applications being incorporated herein in their entirety.

BACKGROUND OF THE INVENTION

The present invention relates to rubber compositions intended in particular for the manufacture of tires or of semi-finished products for tires, and also to the anti-reversion agents usable for thermal protection of such compositions.

DESCRIPTION OF RELATED ART

Since the discovery of the vulcanization or cross-linking of rubber by sulphur, numerous improvements have been made to the base process, but sulphur at present still remains the element which is indispensable from the industrial point of view for cross-linking diene elastomers. The principle of vulcanization lies in the creation of sulphur bridges between two macromolecules by reaction on the double bonds of these diene elastomers. One of the striking characteristics of vulcanization is the simplicity with which this reaction can be controlled by adding compounds having an accelerating or retarding effect. By adjusting the respective amounts of sulphur and accelerators, it is in particular possible to control the vulcanization yield, and to obtain sulphur bridges of different configurations which result, for a given rubber composition, in possible adjustments of the properties, both in the uncured state and in the cured state.

However, sulphur vulcanization has the known drawback of resulting in limited strength of the vulcanized rubber compositions obtained, due to thermal ageing of the latter. In particular, vulcanized rubber compositions of diene elastomers which are cross-linked from sulphur are highly sensitive to temperature when the latter reaches a value close to the initial curing or vulcanization temperature. This results in a drop in the density of the sulphur bridges formed initially upon vulcanization, the distribution of the vulcanization network evolving towards a shortening, that is to say a reduction in the polysulphide bridges in favor of the monosulphide bridges. This phenomenon, which is known as "reversion", is accompanied by degradation of the mechanical properties of the vulcanized rubber compositions.

Thus attempts have been made to eliminate, or at the very least limit, this phenomenon of reversion by using in rubber compositions specific additives, referred to as anti-reversion agents, which make it possible to thermally stabilize the vulcanized rubber compositions. These anti-reversion agents are nowadays forming a major focus of research, particularly in the field of tires for which optimum thermal stability is desired.

One widely described family of anti-reversion agents consists of maleimide compounds, more particularly by bismaleimides or biscitraconimides used alone or in association with other compounds (see for example EP 191931 or U.S. Pat. No. 4,803,250, EP 640114 or WO93/23467, EP 703943 or U.S. Pat. No. 5,872,188, EP 709234 or U.S. Pat. No. 5,503,940, EP 823453 or U.S. Pat. No. 6,079,468, EP 988999, U.S. Pat. No. 5,328,636, U.S. Pat. No. 5,616,279, U.S. Pat. No. 5,623,007, WO92/07904 or U.S. Pat. No. 5,426,155, WO95/16738, application JP2001-226528).

SUMMARY OF THE INVENTION

The Applicants have discovered during their research that, unexpectedly, certain very specific maleimide compounds make it possible to provide vulcanized rubber compositions with improved reversion resistance compared with the aforementioned bismaleimides or biscitraconimides. These specific compounds furthermore do not require the presence of any coagent to reduce the level of reversion of the vulcanized rubber compositions significantly.

Consequently, a first subject of the invention relates to a rubber composition usable for the manufacture of tires, based on at least (i) one diene elastomer, (ii) one reinforcing filler, (iii) one vulcanization system and (iv) one maleimide compound, characterized in that said maleimide compound is a citraconimidomaleimide of specific formula (R=hydrocarbon radical):

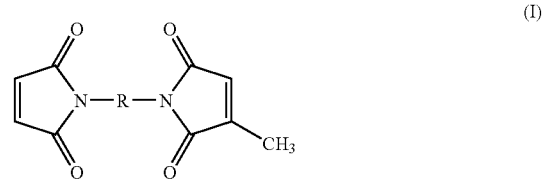

To the Applicants' knowledge, such a citraconimidomaleimide compound had never been used hitherto in a rubber composition usable in particular for the manufacture of tires, even if a generic formula covering this compound may have been given here or there, in some of the aforementioned patent documents.

The subject of the invention is also a process for preparing a rubber composition usable for the manufacture of tires and having an improved reversion resistance, this composition being based on a diene elastomer, a reinforcing filler and a vulcanization system, said process comprising the following steps:

incorporating in a diene elastomer, during a first step referred to as "non-productive", at least one reinforcing filler, by thermomechanically kneading the entire mixture, in one or more stages, until a maximum temperature of between 110° C. and 190° C. is reached;

cooling the entire mixture to a temperature of less than 100° C.;

then incorporating, during a second step referred to as "productive", the vulcanization system;

kneading the entire mixture until a maximum temperature of less than 110° C. is reached, and being characterized in that there is furthermore incorporated, during any one of the steps of the process, a citraconimidomaleimide compound of formula (I).

The subject of the invention is also the use of a composition according to the invention for the manufacture of a finished article or a semi-finished product made of rubber intended for any ground contact system of motor vehicles, such as tires, internal safety supports for tires, wheels, rubber springs, elastomeric joints, or other suspension and anti-vibration elements.

A very particular subject of the invention is the use of a composition according to the invention for the manufacture of tires or semi-finished products made of rubber intended for such tires, these semi-finished products preferably being selected from the group comprising treads, crown reinforcement plies, sidewalls, carcass reinforcement plies, beads, protectors, underlayers, rubber blocks and other internal rubbers, in particular decoupling rubbers, intended to provide the connection or the interface between the aforementioned zones of the tires.

The subject of the invention is also the finished articles and semi-finished products made of rubber themselves, in particular tires and semi-finished products for tires, when they comprise an elastomeric composition according to the invention. The tires according to the invention are in particular intended for passenger vehicles and for industrial vehicles selected from among vans, "heavy vehicles"—i.e. subway trains, buses, road transport machinery (lorries, tractors, trailers), off-road vehicles—agricultural or construction machinery, aircraft, and other transport or handling vehicles.

The invention and its advantages will be readily understood in the light of the description and examples of embodiment which follow, and of the attached figures which show processes for obtaining citraconimidomaleimide compounds usable in the compositions of the invention.

DESCRIPTION OF PREFERRED EMBODIMENTS

I. Measurements and Tests Used

Figure 1:
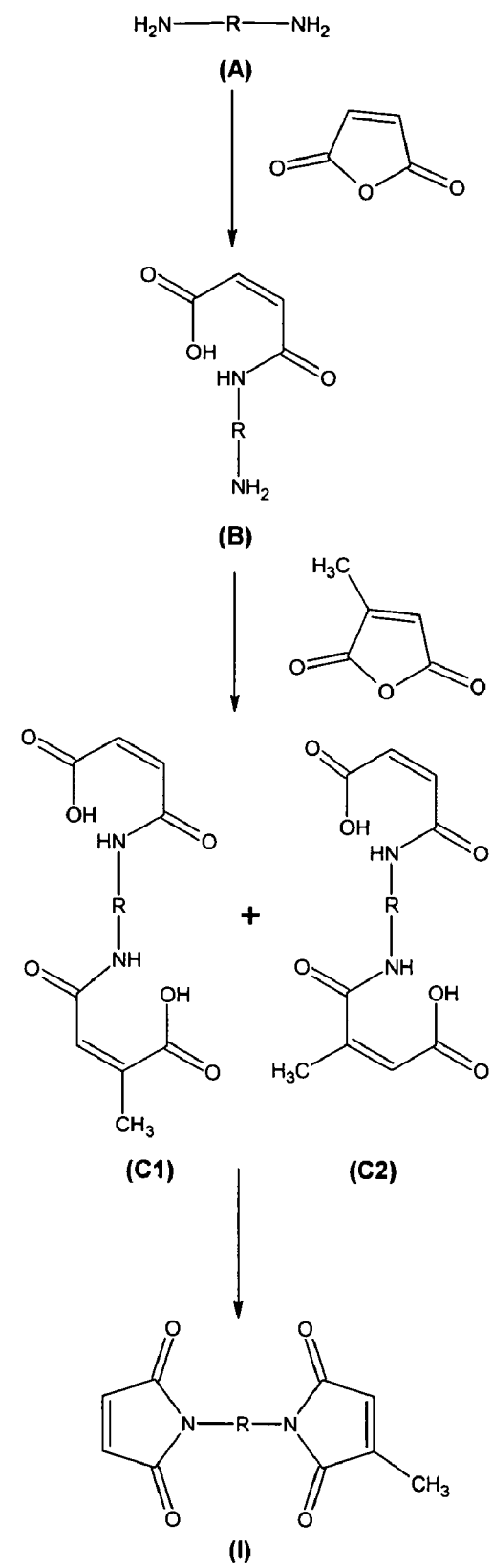
FIG. 1 illustrates a preferred method of synthesizing a citraconimidomaleimide compound.

The rubber compositions are characterized, before and after curing, as indicated below.

I-1. Mooney Plasticity

An oscillating consistometer such as described in French Standard NF T 43-005 (1991) is used. The Mooney plasticity is measured in accordance with the following principle: the composition in the uncured state (i.e. before curing or vulcanization) is molded in a cylindrical enclosure heated to 100° C. After one minute's preheating, the rotor turns within the test piece at 2 rpm, and the torque used for maintaining this movement is measured after four minutes' rotation. The Mooney plasticity (ML 1+4) is expressed in "Mooney units" (MU, with 1 MU=0.83 N.m).

I-2. Scorching Time

The measurements are effected at 130° C., in accordance with French Standard NF T 43-005 (1991). The evolution of the consistometric index as a function of time makes it possible to determine the scorching time for the rubber compositions, assessed in accordance with the above standard by the parameter T5 (case of a large rotor), expressed in minutes, and defined as being the time necessary to obtain an increase in the consistometric index (expressed in MU) of 5 units above the minimum value measured for this index.

I-3. Rheometry

The measurements are effected at 150° C. with an oscillating-chamber rheometer, in accordance with DIN Standard 53529—part 3 (June 1983). The evolution of the rheometric torque as a function of time describes the evolution of the stiffening of the composition following the vulcanization reaction. The measurements are processed in accordance with DIN Standard 53529—part 2 (March 1983): the minimum and maximum torques, measured in dN.m (deciNewton.metres), are referred to respectively as $C_{min}$ and $C_{max}$; the deviation $\Delta$Torque (in dN.m) is also measured between $C_{max}$ and $C_{min}$, which makes it possible to assess the vulcanization yield.

Unless indicated otherwise, the mechanical properties indicated hereafter (section I-4) are those measured at the "curing optimum", that is to say, in known manner, those obtained, for a given curing temperature, after the minimum curing time to obtain the maximum rheometric torque $C_{max}$.

I-4. Tensile Tests

These tests make it possible to determine the elasticity stresses and the properties at break. Unless indicated otherwise, they are effected in accordance with French Standard NF T 46-002 of September 1988. The nominal secant moduli (or apparent stresses, in MPa) at 10% elongation (ME10), 100% elongation (ME100) and 300% elongation (ME300) are measured in a second elongation (i.e. after a cycle of accommodation to the amount of extension provided for the measurement itself). All these tensile measurements are effected under normal conditions of temperature (23±2° C.) and humidity (50±5% relative humidity), in accordance with French Standard NF T 40-101 (December 1979).

I-5. Measurement of the Reversion

The reversion may be analyzed using different methods, the aim being to determine, indirectly, the evolution of the density of the sulphur bridges, between curing "at the optimum" (corresponding to the maximum torque $C_{max}$) and prolonged curing.

The first approach consists of measuring the evolution (decrease) of the rheometric torque: the parameters $\Delta R_{60}$ and $\Delta R_{180}$ represent the evolution in % of the torque between $C_{max}$ and the torque measured after 60 or 180 minutes' curing, respectively, at a given curing temperature (for example 150° C.). The higher the parameters $\Delta R_{60}$ and $\Delta R_{180}$, the greater the phenomenon of reversion.

The second approach consists of measuring the evolution (decrease) of the aforementioned moduli ME100 or ME300: the parameters $\Delta$ME100 and $\Delta$ME300 correspond to the evolution in % of the respective moduli measured at the curing optimum ($C_{max}$) and after 6 hours' curing, at a given curing temperature (150° C.). The higher the parameters $\Delta$ME100 or $\Delta$ME300, the greater the phenomenon of reversion.

II. Conditions of Implementation of the Invention

The rubber compositions according to the invention are based on at least one (that is to say one or more) diene elastomer(s), one (one or more) reinforcing filler(s), one (one or more) cross-linking system(s) and one (one or more) citraconimidomaleimide compound(s) of formula (I) above.

Of course, the expression composition "based on" is to be understood to mean a composition comprising the mixture and/or the reaction product of the various constituents used, some of these base constituents being liable to, or intended to, react together, at least in part, during the different phases of manufacture of the composition, in particular during the vulcanization thereof.

In the present description, unless expressly indicated otherwise, all the percentages (%) indicated are mass percentages.

II-1. Diene Elastomer

"Diene" elastomer or rubber is understood to mean, in known manner, an elastomer resulting at least in part (i.e. a homopolymer or a copolymer) from diene monomers (monomers bearing two double carbon-carbon bonds, whether conjugated or not).

These diene elastomers may be classed in two categories: "essentially unsaturated" or "essentially saturated".

Generally "essentially unsaturated" is understood to mean a diene elastomer resulting at least in part from conjugated diene monomers, having a content of members or units of diene origin (conjugated dienes) which is greater than 15% (mole percent).

Thus, for example, diene elastomers such as butyl rubbers or copolymers of dienes and of alpha-olefins of the EPDM type do not fall within the preceding definition, and may in particular be described as "essentially saturated" diene elastomers (low or very low content of units of diene origin which is always less than 15%).

Within the category of "essentially unsaturated" diene elastomers, "highly unsaturated" diene elastomer is understood to mean in particular a diene elastomer having a content of units of diene origin (conjugated dienes) which is greater than 50%.

These definitions being given, the following are understood more particularly to be meant by diene elastomer capable of being used in the compositions according to the invention:

(a)—any homopolymer obtained by polymerisation of a conjugated diene monomer having 4 to 12 carbon atoms;

(b)—any copolymer obtained by copolymerisation of one or more dienes conjugated together or with one or more vinyl-aromatic compounds having 8 to 20 carbon atoms;

(c)—a ternary copolymer obtained by copolymerisation of ethylene, of an α-olefin having 3 to 6 carbon atoms with a non-conjugated diene monomer having 6 to 12 carbon atoms, such as, for example, the elastomers obtained from ethylene, from propylene with a non-conjugated diene monomer of the aforementioned type, such as in particular 1,4-hexadiene, ethylidene norbornene or dicyclopentadiene;

(d)—a copolymer of isobutene and isoprene (butyl rubber), and also the halogenated, in particular chlorinated or brominated, versions of this type of copolymer.

Although it applies to any type of diene elastomer, the person skilled in the art of tires will understand that the present invention is used first and foremost with essentially unsaturated diene elastomers, in particular those of type (a) or (b) above.

Suitable conjugated dienes are, in particular, 1,3-butadiene, 2-methyl-1,3-butadiene, 2,3-di($C_1$-$C_5$alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl-aromatic compounds are, for example, styrene, ortho-, meta- and para-methylstyrene, the commercial mixture "vinyltoluene", para-tert. butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl-aromatic units. The elastomers may have any microstructure, which is a function of the polymerisation conditions used, in particular of the presence or absence of a modifying and/or randomizing agent and the quantities of modifying and/or randomizing agent used. The elastomers may for example be block, random, sequential or microsequential elastomers, and may be prepared in dispersion or in solution; they may be coupled and/or starred or alternatively functionalised with a coupling and/or starring or functionalizing agent.

Polybutadienes are suitable, and in particular those having a content of 1,2-units of between 4% and 80%, or those having a cis-1,4 content of more than 80%, polyisoprenes, butadiene/styrene copolymers and in particular those having a styrene content of between 5% and 50% by weight and more particularly between 20% and 40%, a content of 1,2-bonds of the butadiene fraction of between 4% and 65%, a content of trans-1,4 bonds of between 20% and 80%, butadiene/isoprene copolymers and in particular those having an isoprene content of between 5% and 90% by weight and a glass transition temperature (Tg, measured in accordance with ASTM D3418-82) of −40° C. to −80° C., isoprene/styrene copolymers and in particular those having a styrene content of between 5% and 50% by weight and a Tg of between −25° C. and −50° C. In the case of butadiene/styrene/isoprene copolymers, those which are suitable are in particular those having a styrene content of between 5% and 50% by weight and more particularly between 10% and 40%, an isoprene content of between 15% and 60% by weight, and more particularly between 20% and 50%, a butadiene content of between 5% and 50% by weight and more particularly between 20% and 40%, a content of 1,2-units of the butadiene fraction of between 4% and 85%, a content of trans-1,4 units of the butadiene fraction of between 6% and 80%, a content of 1,2-plus 3,4-units of the isoprene fraction of between 5% and 70%, and a content of trans-1,4 units of the isoprene fraction of between 10% and 50%, and more generally any butadiene/styrene/isoprene copolymer having a Tg of between −20° C. and −70° C.

In summary, the diene elastomer of the composition according to the invention is preferably selected from the group of highly unsaturated diene elastomers which consists of polybutadienes (BR), polyisoprenes (IR), natural rubber (NR), butadiene copolymers, isoprene copolymers and mixtures of these elastomers. Such copolymers are more preferably selected from the group which consists of butadiene/styrene copolymers (SBR), isoprene/butadiene copolymers (BIR), isoprene/styrene copolymers (SIR) and isoprene/butadiene/styrene copolymers (SBIR).

According to one particularly preferred embodiment, the diene elastomer is majoritarily (that is to say to more than 50 phr) an SBR, be it an SBR prepared in emulsion ("ESBR") or an SBR prepared in solution ("SSBR"), or an SBR/BR, SBR/NR (or SBR/IR), or alternatively BR/NR (or BR/IR) blend (mixture). In the case of an SBR elastomer, in particular an SBR having a styrene content of between 20% and 30% by weight, a content of vinyl bonds of the butadiene fraction of between 15% and 65%, a content of trans-1,4 bonds of between 15% and 75%, and a Tg of between −20° C. and −55° C. is used; such an SBR may advantageously be used in a mixture with a BR having preferably more than 90% cis-1,4 bonds.

According to another particularly preferred embodiment, the diene elastomer is majoritarily (to more than 50 phr) an isoprene elastomer. This is the case in particular when the compositions of the invention are intended to constitute, in tires, the rubber matrices of some treads (for example for industrial vehicles), of crown reinforcement plies (for example of working plies, protective plies or wrapping plies), of carcass reinforcement plies, of sidewalls, of beads, of protectors, of underlayers, of blocks of rubber and other internal rubbers providing the interface between the aforementioned zones of the tires.

The compositions according to the invention are for example advantageously usable as "decoupling rubbers" in those zones of the tire (referred to as "decoupling zones") having the function of providing mechanical decoupling between two different parts of said tire, these zones being known to be exposed to the greatest risks of heating, and therefore of reversion. They may also advantageously constitute the annular rubber profiled elements used for stiffening the sidewalls of tires designed for running with a flat tire ("run-flat tires"—see by way of example U.S. Pat. No. 5,427, 166).

"Isoprene elastomer" is understood to mean, in known manner, an isoprene homopolymer or copolymer, in other words a diene elastomer selected from the group consisting of natural rubber (NR), synthetic polyisoprenes (IR), the various isoprene copolymers and mixtures of these elastomers. Of the isoprene copolymers, mention will be made in particular of isobutene/isoprene copolymers (butyl rubber—IIR), isoprene/styrene copolymers (SIR), isoprene/butadiene copolymers (BIR) or isoprene/butadiene/styrene copolymers (SBIR). This isoprene elastomer is preferably natural rubber or a synthetic cis-1,4 polyisoprene; of these synthetic polyisoprenes, preferably polyisoprenes having a content (mole %) of cis-1,4 bonds greater than 90%, more preferably still greater than 98%, are used.

According to another preferred embodiment of the invention, in particular when it is intended for a tire sidewall or for an airtight internal rubber of a tubeless tire (or other element impermeable to air), the composition according to the invention may contain at least one essentially saturated diene elastomer, in particular at least one EPDM copolymer or a butyl rubber (possibly chlorinated or brominated), whether these copolymers be used alone or in a mixture with highly unsaturated diene elastomers such as mentioned previously, in particular NR or IR, BR or SBR.

The compositions of the invention may contain a single diene elastomer or a mixture of several diene elastomers, the diene elastomer(s) possibly being used in association with any type of synthetic elastomer other than a diene elastomer, or even with polymers other than elastomers, for example thermoplastic polymers.

II-2. Reinforcing Filler

Any type of reinforcing filler known for its ability to reinforce a rubber composition usable for the manufacture of tires may be used, for example an organic filler such as carbon black or alternatively a reinforcing inorganic filler such as silica, with which a coupling agent will then be associated in this second case.

Suitable carbon blacks are all the carbon blacks, particularly blacks of the type HAF, ISAF and SAF, conventionally used in tires (what are called tire-grade blacks). Of the latter, reference will more particularly be made to the reinforcing carbon blacks of series 100, 200 or 300 (ASTM grades), such as, for example, the blacks N115, N134, N234, N326, N330, N339, N347, N375, or alternatively, depending on the intended applications, the blacks of higher series (for example N660, N683, N772).

"Reinforcing inorganic filler" is to be understood here, in known manner, to mean any inorganic or mineral filler, whatever its colour and its origin (natural or synthetic), also referred to as "white" filler, "clear" filler or alternatively "non-black" filler, in contrast to carbon black, this inorganic filler being capable, on its own, without any other means than an intermediate coupling agent, of reinforcing a rubber composition intended for the manufacture of tires, in other words which is capable of replacing a conventional tire-grade carbon black in its reinforcement function; such a filler is generally characterized, in known manner, by the presence of hydroxyl (—OH) groups at its surface.

Suitable reinforcing inorganic fillers are in particular mineral fillers of siliceous type, in particular silica ($SiO_2$), or of aluminous type, in particular alumina ($Al_2O_3$). The silica used may be any reinforcing silica known to the person skilled in the art, in particular any precipitated or fumed silica having a BET surface area and a specific CTAB surface area both of which are less than 450 $m^2/g$, preferably from 30 to 400 $m^2/g$. As highly dispersible precipitated silicas (referred to as "HD"), mention will be made of for example the silicas Ultrasil 7000 and Ultrasil 7005 from Degussa, the silicas Zeosil 1165 MP, 1135 MP and 1115 MP from Rhodia, the silica Hi-Sil EZ150G from PPG, and the silicas Zeopol 8715, 8745 and 8755 from Huber. Examples of reinforcing aluminas are the aluminas "Baikalox" "A125" or "CR125" from Baïkowski, "APA-100RDX" from Condea, "Aluminoxid C" from Degussa or "AKP-G015" from Sumitomo Chemicals.

For coupling the reinforcing inorganic filler to the diene elastomer, as is well-known a coupling agent (or bonding agent) which is at least bifunctional which is intended to provide a sufficient chemical and/or physical connection between the inorganic filler (surface of its particles) and the diene elastomer, in particular bifunctional organosilanes or polyorganosiloxanes, will be used.

Preferably, the amount of total reinforcing filler (carbon black and/or reinforcing inorganic filler) is between 20 and 200 phr, more preferably between 30 and 150 phr (parts by weight per hundred parts of elastomer), the optimum differing according to the intended applications: the level of reinforcement expected of a bicycle tire, for example, is in known manner distinctly lower than that required for a tire capable of travelling at a sustained high speed, for example a motorcycle tire, a passenger-vehicle tire or a tire for a utility vehicle such as a heavy vehicle.

II-3. Citraconimidomaleimide

The rubber compositions of the invention have the novel, inventive characteristic of using, as anti-reversion agent, a citraconimidomaleimide compound comprising both a maleimide function and a citraconimide function, of the following formula (I):

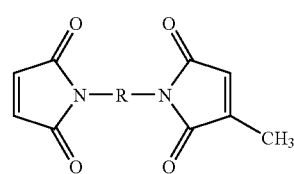

(I)

The radical R is any hydrocarbon radical, whether aromatic or aliphatic, cyclic or acyclic, substituted or non-substituted, straight-chain or branched. Preferably, it comprises from 1 to 25 carbon atoms, and possibly one or more heteroatom(s) selected from among O, N and S.

More preferably, R is selected from the group consisting of alkylenes having from 1 to 20 carbon atoms, cycloalkylenes having from 6 to 24 carbon atoms, arylenes having from 6 to 18 carbon atoms and aralkylenes having from 7 to 25 carbon atoms.

By way of examples of citraconimidomaleimides which meet to this definition, mention will be made in particular of those belonging to the preferred group consisting of N-(citraconimido-ethyl)maleimide, N-(citraconimido-hexamethyl)maleimide, N-(citraconimido-dodecamethyl)maleimide, N-(citraconimido-oxy-dipropyl)maleimide, N-(citraconimido-1,3-cyclohexyl)maleimide, N-(citraconimido-1,4-cyclohexyl)maleimide, N-(1'-citraconimido-3,3'-dimethyl-4,4'-biphenyl)maleimide, N-(citraconimido-m-phenyl)maleimide, N-(citraconimido-p-phenyl)maleimide, N-(citraconimido-o-phenyl)maleimide, N-(citraconimido-1,3-naphthyl)maleimide, N-(citraconimido-1,4-naphthyl)maleimide, N-(citraconimido-1,5-naphthyl)maleimide, N-(3-citraconimido-4,6-dimethyl-phenyl)maleimide, N-(3-citraconimido-4-methyl-phenyl)maleimide and N-(3-citraconimido-6-methyl-phenyl)maleimide; N-(3-citraconimido-2-methyl-phenyl)maleimide; N-(1'-citraconimido-4,4'-methylene-bi-phenyl)maleimide, N-[2-(methylene-citraconimido)-phenyl]-methylene-maleimide; N-[3-(methylene-citraconimido)-phenyl]-methylene-maleimide; N-[4-(methylene-citraconimido)-phenyl]-methylene-maleimide; N-(citraconimido-oxy-dipropyl)maleimide, N-(citraconimido-oxy-di-p-phenyl)maleimide, N-(1'-citraconimido-4,4'-dithio-biphenyl)maleimide, and mixtures of these compounds.

According to one particularly preferred embodiment of the invention, the citraconimidomaleimide is more preferably selected from among the group consisting of N-(citraconimido-m-phenyl)maleimide, N-(citraconimido-p-phenyl)maleimide, N-(citraconimido-o-phenyl)maleimide, N-(3-citraconimido-4,6-dimethyl-phenyl)maleimide, N-(3-citraconimido-4-methyl-phenyl)maleimide, N-(3-citraconimido-6-methyl-phenyl)maleimide, N-(3-citraconimido-2-methyl-phenyl)maleimide, N-(1'-citraconimido-4,4'-methylene-bi-phenyl)maleimide, N-[2-(methylene-citraconimido)-phenyl]-methylene-maleimide, N-[3-(methylene-citraconimido)-phenyl]-methylene-maleimide, N-[4-(methylene-citraconimido)-phenyl]-methylene-maleimide, and mixtures of these compounds.

According to one more particularly preferred embodiment, R is a phenylene group, the citraconimidomaleimide selected being even more preferably N-(citraconimido-p-phenyl)maleimide.

The citraconimidomaleimide is present in the composition according to the invention in a preferred amount of between 0.1 and 10 phr. Below the minimum indicated, the technical effect desired may be inadequate, whereas beyond the maximum indicated there are the dual risks for the compositions of plasticising in the uncured state and of excessive stiffening in the cured state. For all these reasons, an amount more preferably within a range from 0.2 to 5 phr is used. A quantity within a range from 0.2 to 2.5 phr has proved particularly well suited for application to tires.

The compounds of formula (I) described above may be prepared by a double addition/elimination reaction of a diamine in the presence of maleic anhydride and citraconic anhydride, followed by a cyclisation step.

By way of example, the attached FIG. 1 illustrates a preferred synthesis method, comprising the following steps based on known methods (R having the above meanings):

a) the starting point is a diamine (hereafter product A) of formula (A):

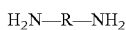

b) it is placed in the presence of maleic anhydride in an inert organic solvent, an addition/elimination reaction takes place, resulting in (hereafter product B) a maleamic acid of formula (B):

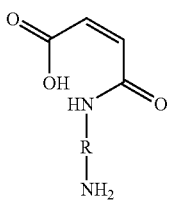

c) The product B obtained, placed in the presence of citraconic anhydride in an inert organic solvent, will bring about a second addition/elimination reaction similar to the previous one and will result in a maleamic/citraconamic diacid (product C), which may be in the form of two regioisomers (products C1 and C2) of respective formulae (C1) and (C2):

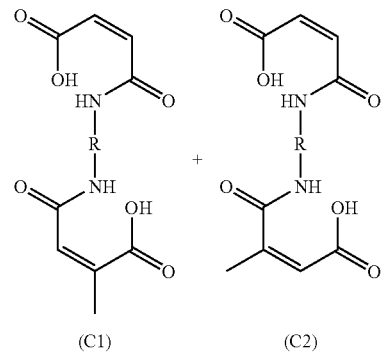

d) then a cyclisation step of product C is carried out, in the presence of an anhydrous organic solvent (for example toluene), of a catalyst of the Lewis acid type (for example $ZnCl_2$) and a cyclising agent such as hexamethyldisilazane (HMDS) to produce the intended product of formula (I):

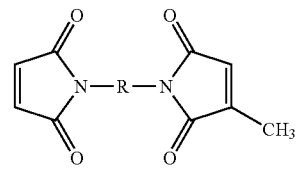

The person skilled in the art will readily understand that one possible variant of this synthesis equation would be to react the diamine in a first phase with the citraconic anhydride, then in a second phase with the maleic anhydride, in other words to invert the order of the maleimide reagents in steps a) and b) above.

II-4. Vulcanization System

The vulcanization system proper is based on sulphur (or a sulphur-donating agent) and a primary vulcanization accelerator. To this base vulcanization system there are added, incorporated during the first, non-productive phase and/or during the productive phase, both as described later, various known secondary accelerators or vulcanization activators such as zinc oxide, stearic acid or equivalent compounds, guanidine derivatives (in particular diphenylguanidine).

The sulphur is used in a preferred amount of between 0.5 and 10 phr, more preferably of between 1 and 8 phr, in particular between 1 and 6 phr when the composition of the invention is intended, according to a preferred embodiment of the invention, to constitute an inner tire rubber, in particular a decoupling rubber.

The primary vulcanization accelerator is for its part used in a preferred amount of between 0.5 and 10 phr, more preferably of between 0.5 and 5.0 phr.

It is known that such an accelerator must permit crosslinking of the rubber compositions within times which are acceptable industrially, while preserving a minimum safety period ("scorching time") during which the compositions can be shaped without any risk of premature vulcanization ("scorching").

Any compound capable of acting as vulcanization accelerator for the diene elastomers in the presence of sulphur may be used.

In particular accelerators of the thiazole type are suitable, as are their derivatives of formula (II):

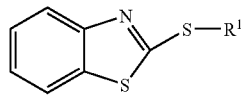

in which $R^1$ represents a hydrogen atom, a 2-mercaptobenzothiazyl group of formula (III):

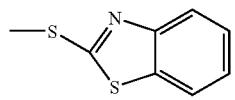

or alternatively a group of formula (IV):

in which $R^2$ and $R^3$ represent independently a hydrogen atom, a 2-mercaptobenzothiazyl group (formula III), a $C_1$-$C_4$ alkyl group or a $C_5$-$C_8$ cycloalkyl group, comprising preferably 6 units, said ring possibly comprising at least one heteroatom such as S, O or N.

Thiazole accelerators and preferred derivatives are in particular selected from the group consisting of 2-mercaptobenzothiazole, 2-mercaptobenzothiazyl disulphide, N-cyclohexyl-2-benzothiazyl sulphenamide, N,N-dicyclohexyl-2-benzothiazyl sulphenamide, N-tert.-butyl-2-benzothiazyl sulphenamide, N-cyclohexyl-2-benzothiazyl sulphenimide, N-tert.-butyl-2-benzothiazyl sulphenimide and mixtures of these compounds.

Suitable accelerators are also the compounds of the family of thiurams (formula V) and zinc dithiocarbamate derivatives (formula VI):

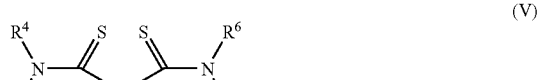

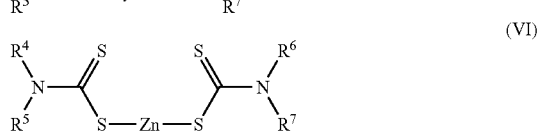

in which y varies from 1 to 4, y is more particularly equal to 1 or 2; $R^4$, $R^5$, $R^6$ and $R^7$ each represent independently an alkyl group comprising from 1 to 8 carbon atoms, a benzyl group, a combination of $R^4$ and $R^5$ and a combination of $R^6$ and $R^7$ to form a cyclic pentamethylene group or a cyclic methyl-pentamethylene group and in which $R^4$ and $R^5$ and $R^6$ and $R^7$ are joined together.

Accelerators of thiuram type are in particular selected from the preferred group consisting of tetramethylthiuram monosulphate, tetramethylthiuram disulphide, tetraethylthiuram disulphide, tetrabutylthiuram disulphide, tetra-isobutylthiuram disulphide, tetrabenzylthiuram disulphide and mixtures of these compounds. Among these, tetrabenzylthiuram disulphide is more preferably used.

By way of other examples of accelerators usable in the compositions of the invention, mention will be made of zinc dithiocarbamates, in particular zinc tetramethyl dithiocarbamate, zinc tetraethyl dithiocarbamate and zinc tetrabenzyl dithiocarbamate. Of these, zinc tetrabenzyl dithiocarbamate is more preferably used.

To summarize, the primary vulcanization accelerators used in the composition according to the invention are more preferably selected from the group consisting of 2-mercaptobenzothiazyl disulphide (abbreviated to "MBTS"), N-cyclohexyl-2-benzothiazyl sulphenamide (abbreviated to "CBS"), N,N-dicyclohexyl-2-benzothiazyl sulphenamide (abbreviated to "DCBS"), N-tert.-butyl-2-benzothiazyl sulphenamide (abbreviated to "TBBS"), N-tert.-butyl-2-benzothiazyl sulphenimide (abbreviated to "TBSI") and mixtures of these compounds.

II-5. Various Additives

Of course, the elastomeric compositions according to the invention may also comprise all or some of the additives usually used in rubber compositions intended for the manufacture of tires, such as, for example, plasticisers or extender oils, whether the latter be aromatic or non-aromatic in nature, pigments, protective agents such as anti-ozone waxes, chemical antiozonants, antioxidants, anti-fatigue agents, adhesion promoters, coupling activators, reinforcing resins, methylene acceptors and/or donors, and even other anti-reversion agents, for example conventional bismaleimides or biscitraconimides.

Preferably, these compositions comprise, as preferred non-aromatic or only very slightly aromatic plasticising agent, at least one compound selected from among the group consisting of naphthenic oils, paraffinic oils, MES oils, TDAE oils, glycerol esters (in particular trioleates), hydrocarbon plasticising resins preferably having a high value of Tg (preferably greater than 30° C.), and mixtures of such compounds.

In the event that the reinforcing filler used is an inorganic filler, advantageously covering agents for such an inorganic filler, more generally processing aids liable, in known manner, owing to an improvement in the dispersion of the inorganic filler in the rubber matrix and to a reduction in the viscosity of the compositions, to improve their ability to be worked in the uncured state can be used.

II-6. Preparation of the Rubber Compositions

The compositions are produced in suitable mixers, using two successive preparation phases well-known to the person skilled in the art: a first phase of thermomechanical working or kneading (referred to as "non-productive" phase) at high temperature, up to a maximum temperature of between 110° C. and 190° C., preferably between 130° C. and 180° C., followed by a second phase of mechanical working (referred to as "productive" phase) down to a lower temperature, typically less than 110° C., for example between 40° C. and 100° C., during which finishing phase the vulcanization system is incorporated.

The process according to the invention for preparing a rubber composition having improved reversion resistance comprises the following steps:

- incorporating in a diene elastomer, during a first step referred to as "non-productive", at least one reinforcing filler, by thermomechanically kneading the entire mixture, in one or more stages, until a maximum temperature of between 110° C. and 190° C. is reached;
- cooling the entire mixture to a temperature of less than 100° C.;
- then incorporating, during a second step referred to as "productive", the vulcanization system;
- kneading the entire mixture until a maximum temperature of less than 110° C. is reached, and it is characterized in that there is furthermore incorporated, during any one of the steps of the process, a citraconimidomaleimide compound of formula (I) above.

By way of example, the non-productive phase is effected in a single thermomechanical step during which in a first phase all the base constituents necessary (diene elastomer, reinforcing filler and coupling agent if necessary, possibly all or some of the citraconimidomaleimide compound), then in a second phase, for example after one to two minutes' kneading, the other additives, any complementary covering agents or processing agents, with the exception of the vulcanization system, are introduced into a suitable mixer, such as a conventional internal mixer. The total duration of the kneading, in this non-productive phase, is preferably between 1 and 15 minutes.

After cooling the mixture thus obtained, the vulcanization system and the citraconimidomaleimide compound (all or the remaining portion, as applicable) is then incorporated in an external mixer such as an open mill, kept at low temperature (for example between 40° C. and 100° C.). The whole is then mixed (productive phase) for several minutes, for example between 2 and 15 minutes.

The final composition thus obtained can then be calendered, for example in the form of a film or a sheet, or alternatively extruded, for example in order to form a rubber profiled element used for manufacturing a semi-finished product for tires, such as plies, treads, underlayers, various rubber blocks, whether or not reinforced by textile or metallic reinforcements, intended to form part of the structure of the tire.

The vulcanization (or curing) can then be carried out in known manner at a temperature generally of between 130° C. and 200° C., preferably under pressure, for a sufficient time which may vary for example between 5 and 90 min according to in particular the curing temperature, the vulcanization system adopted and the vulcanization kinetics of the composition in question.

The invention relates to the rubber compositions previously described, both in the "uncured" state (i.e. before curing) and in the "cured" or vulcanized state (i.e. after vulcanization).

III. Examples of Embodiment of the Invention

III-1. Synthesis of the Citraconimidomaleimide

The N-(p-citraconimidophenyl)-maleimide is prepared by reacting 1,4-phenylenediamine on maleic anhydride then citraconic anhydride; the diacid then generated is then cyclised based on a synthesis process for N-alkyl- and N-arylimide derivatives such as described in J. Org. Chem., Vol. 62 No. 8, 2652-2654, 1997.

Figure 2:
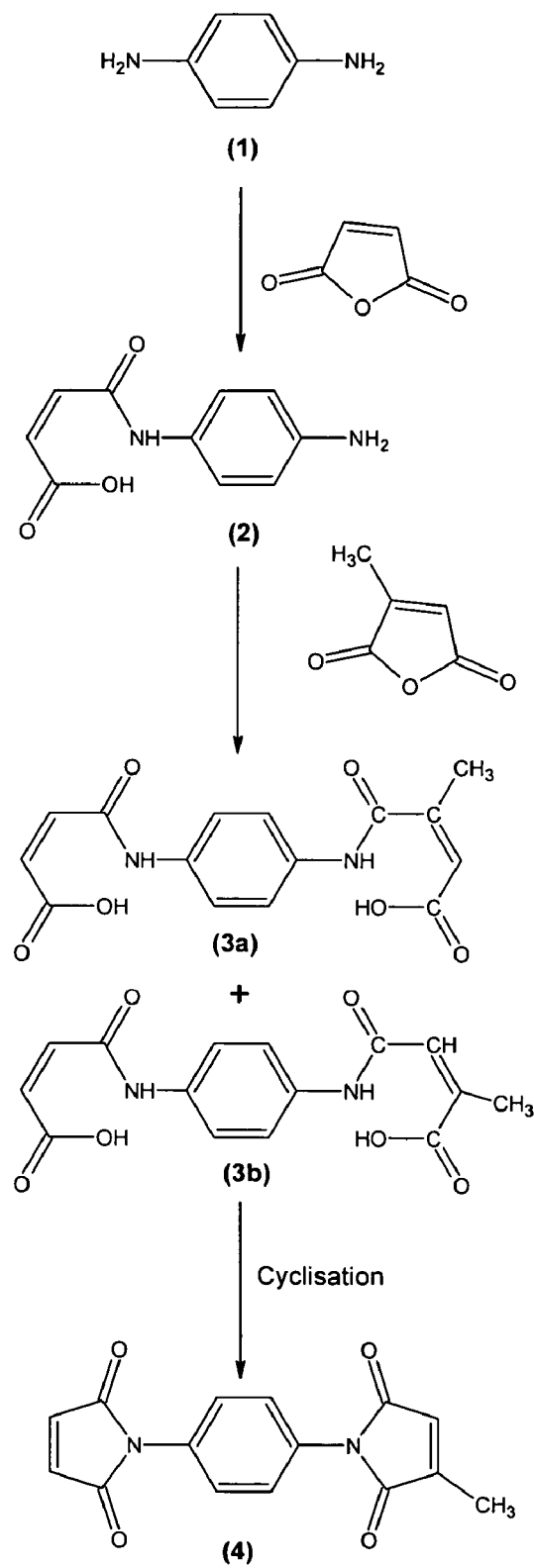
FIG. 2 illustrates a method of synthesizing N-(p-citraconimidophenyl)-maleimide.

More precisely, this synthesis is carried out in three steps as shown in the appended FIG. 2.

A) $1^{st}$ step: synthesis of the N-(p-amino-phenyl)maleamic acid (product (2) in FIG. 2):

The 1,4-phenylenediamine (1) (22.70 g or 0.200 mol—1 equivalent) and 210 ml of THF (tetrahydrofuran) were poured into a 500 ml two-necked flask. To this solution is added over 1 hour, at ambient temperature, a solution of maleic anhydride (20.60 g or 0.200 mol-1 eq) in 70 ml of THF. After half an hour, a brown/yellow precipitate forms. It is left being magnetically stirred for 16 hours. The precipitate is filtered on a sintered glass filter then rinsed with diethyl ether. This is dried in a vacuum; there is thus obtained 41.19 g of N-(4-amino-phenyl) maleamic acid in the form of a mustard-yellow powder, with a yield of 99%.

B) $2^{nd}$ step: synthesis of the 1,4-phenylene-N-citraconamic-N'-maleamic diacid (products (3a) and (3b) in FIG. 2):

A solution of citraconic anhydride (22.37 g or 0.190 mol-1 eq) in 200 ml of THF is added within 45 min to a suspension of N-(4-amino-phenyl)maleamic acid (2) (41.19 g or 0.190 mol—1 eq) in 400 ml of THF. The reaction mixture is stirred at ambient temperature for 16 hours then cooled in an ice bath for 20 minutes. The precipitate obtained is filtered on a sintered glass filter, rinsed with diethyl ether then dried in a vacuum. There is thus obtained 63.20 g of 1,4-phenylene-N-citraconamic-N'-maleamic diacid in the form of a mustard-yellow powder, with a yield of 99%. $^1$H NMR analysis reveals that the latter is in the form of two regioisomers (3a) and (3b) in identical proportions.

C) $3^{rd}$ step: synthesis of the N-(p-citraconimidophenyl)maleimide (product (4) in FIG. 2):

The diacid (3) (40 g or 0.126 mol—1 eq) and 800 ml of anhydrous toluene are introduced into a 2 l two-necked flask, provided with a condenser and under an inert nitrogen atmosphere. The mixture formed is subjected to mechanical stirring for several minutes, then previously sublimated $ZnCl_2$ (36 g or 0.264 mol—2.1 eq) is added in a single go. The reaction mixture is brought to 80° C. for 10 min then the HMDS (80 ml or 0.378 mol-3 eq) is added slowly. It is left with stirring and heating for 44 hours, then it is evaporated dry using a rotary evaporator (water bath at 80° C. at 1 mm Hg). 500 ml of dichloromethane is added to the yellow powder obtained, and it is heated to reflux for 15 min. to dissolve the maximum of product, it is hot-filtered on a sintered glass filter, the beige precipitate collected corresponding to the $ZnCl_2$. The isolated organic phase is then washed respectively with 10%-strength hydrochloric acid, with saturated $NaHCO_3$, with NaCl, then dried over $MgSO_4$, filtered and then evaporated.

There is thus obtained 25.3 g of N-(p-citraconimidophenyl)maleimide (4) in the form of a yellow powder, with a yield of 71%.

III-2. Preparation of the Compositions

For the following tests, the procedure is as follows: the diene elastomer (or the mixture of diene elastomers, as applicable), the reinforcing filler (carbon black) then, after one to two minutes' kneading, the various other ingredients with the exception of the vulcanization system and the anti-reversion agent are introduced into a conventional internal blade mixer of the "Banbury" type (capacity: approximately 3.5 litres), filled to 70% and the initial tank temperature of which is approximately 60° C.

Thermomechanical working (non-productive phase) is then performed in one step (total duration of kneading equal to about 5 minutes), until a maximum "dropping" temperature of about 160° C. is reached. The mixture thus obtained is recovered, it is cooled and then the vulcanization system and (if it is present in the composition) the anti-reversion agent is added on an external mixer (homo-finisher) at 40° C., by mixing everything (productive phase) for 3 to 4 minutes on this open mill.

The compositions thus obtained are then calendered in the form of sheets (thickness of 2 to 3 mm) or of thin films of rubber in order to measure their physical or mechanical properties, or extruded to form profiled elements which can be used directly, after cutting out and/or assembly to the dimensions desired, as a semi-finished product for tires.

III-3. Characterisation Tests—Results

The object of this test is to demonstrate the improved reversion resistance and thermal stability of a composition according to the invention intended to constitute a decoupling rubber located between the crown reinforcement and the radial carcass reinforcement of a tire of construction-vehicle type.

This composition according to the invention is compared with three control compositions, whether or not comprising an anti-reversion agent, the four compositions tested being identical apart from the following differences:
- composition T-1: control without anti-reversion agent;
- composition T-2: control with conventional anti-reversion agent (bismaleimide);
- composition T-3: control with conventional anti-reversion agent (biscitraconimide);
- composition C-1: composition according to the invention (citraconimidomaleimide).

The bismaleimide compound used in the control composition T-2 is meta-phenylene bismaleimide (abbreviated to "MPBM"), which is well-known to the person skilled in the art and of the following specific formula:

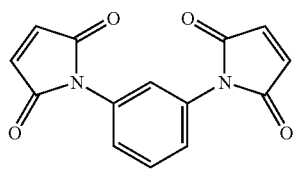

The biscitraconimide of composition T-3 is 1,3-bis-(citraconimidomethyl)-benzene ("Perkalink 900"), which is also well-known and of the following specific formula:

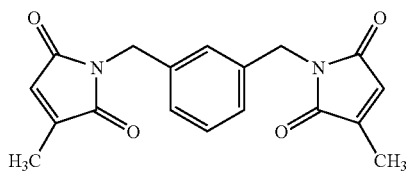

It has for example been described, to mention only a few examples, in the aforementioned patent documents WO92/07904, WO95/16738, EP 823453 or U.S. Pat. No. 6,079,468, EP 988999 and U.S. Pat. No. 5,623,007.

It will be recalled that the citraconimidomaleimide used in the composition according to the invention C-1 satisfies the following specific formula:

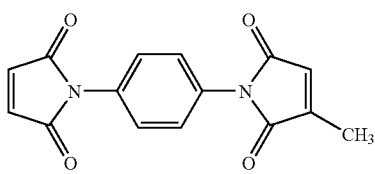

Thus, the essential characteristic distinguishing the above three compounds, and therefore the composition according to the invention C-1 from the control compositions T-2 and T-3, is the presence on one and only one of the two maleimide groups of a methyl group (instead of hydrogen or methyl, respectively, depending on the control in question).

The three maleimide compounds are used in an isomolar amount.

Tables 1 and 2 show the formulation of the different compositions (Table 1—amounts of the different products expressed in phr), the properties before and after curing, the rheometric properties and also different parameters measuring the reversion. To assess the reversion resistance of the compositions, the change in the rheometric torque after 60 min and 180 min at 150° C. is monitored. The thermal stability of the compositions is also assessed by the change in the nominal secant modulus at 100% and at 300% elongation, between the measurement at the curing optimum and after prolonged curing of 6 hours (temperature of 150° C.).

On reading Table 2, it will be noted first of all that the conventional properties of the compositions, before and after curing, are substantially identical: equal values of Mooney plasticity and scorching time to within the accuracy of measurement, tensile moduli (ME100, ME300) and ratio ME300/ME100 (known indication of reinforcement) which are very close, rheometric properties which are fairly close.

However, it is the parameters of measurement of the reversion which demonstrate the full advantage of the composition according to the invention compared with the three control compositions.

The thermal stability of the composition C-1 appears noteworthy, distinctly greater than that observed on the three controls T-1, T-2 and T-3, whatever the parameter used (in accordance with the directions given in section I-5).

In fact, the changes $\Delta R_{60}$ and $\Delta R_{180}$ like those of the moduli $\Delta ME100$ and $\Delta ME300$ all indicate very clearly that, on one hand, the phenomenon of reversion is nonexistent on the composition of the invention, whereas it remains relatively pronounced on the control composition T-2 despite the presence of conventional bismaleimide (MPBM), and that, on the other hand, no significant change, in either direction, is observed over time on the composition of the invention, unlike the control composition T-3 ("Perkalink 900"), the characteristics of which do not decrease but increase, very substantially. Nor do such positive, not negative, variations $\Delta$ indicate a problem of reversion but stiffening of the material which, at the very least in the general case, may be considered to be just as disadvantageous.

It must therefore be concluded from this that it is the presence of one and only one methyl group on one and only one of the two maleimide groups, in other words the presence both of a maleimide function and of a citraconimide function on the same molecule, which imparts this unexpected thermal stability to the rubber compositions of the invention.

TABLE 1

|  | Composition No.: | | | |
| --- | --- | --- | --- | --- |
|  | T-1 | T-2 | T-3 | C-1 |
| NR (1) | 100 | 100 | 100 | 100 |
| carbon black (2) | 35 | 35 | 35 | 35 |
| ZnO (3) | 5 | 5 | 5 | 5 |
| stearic acid (4) | 1.5 | 1.5 | 1.5 | 1.5 |
| antioxidant (5) | 1.5 | 1.5 | 1.5 | 1.5 |
| bismaleimide (6) | — | 1.5 | — | — |
| biscitraconimide (7) | — | — | 1.8 | — |
| citraconimidomaleimide (8) | — | — | — | 1.6 |

TABLE 1-continued

|  | Composition No.: | | | |
| --- | --- | --- | --- | --- |
|  | T-1 | T-2 | T-3 | C-1 |
| sulphur (9) | 1.6 | 1.6 | 1.6 | 1.6 |
| accelerator (10) | 0.6 | 0.6 | 0.6 | 0.6 |

(1) natural rubber (peptised);
(2) N375 (from Cabot);
(3) zinc oxide (industrial grade—from Umicore);
(4) stearin ("Pristerene 4931") from Uniqema;
(5) N-1,3-dimethylbutyl-N-phenyl-para-phenylenediamine ("Santoflex 13" from Flexsys);
(6) MPBM (from Safic Alcan);
(7) "Perkalink 900" (from Flexsys);
(8) N-(p-maleimidophenyl)-citraconimide synthesised in accordance with section III-1;
(9) sulphur (synthetic sulphur from Solvay);
(10) CBS (N-cyclohexyl-2-benzothiazyl-sulphenamide)—("Santocure CBS" from Flexsys).

TABLE 2

|  | Composition No.: | | | |
| --- | --- | --- | --- | --- |
|  | T-1 | T-2 | T-3 | C-1 |
| Properties before curing: | | | | |
| Mooney (MU) | 54 | 54 | 48 | 53 |
| T5 (min) | 20 | 21 | 21 | 20 |
| Properties after curing (optimum at 150° C.): | | | | |
| ME100 (MPa) | 1.55 | 1.48 | 1.47 | 1.44 |
| ME300 (MPa) | 1.92 | 1.95 | 1.95 | 1.88 |
| ME300/ME100 | 1.32 | 1.32 | 1.33 | 1.31 |
| Rheometric properties (150° C.): | | | | |
| $C_{min}$ (dN · m) | 0.8 | 0.8 | 0.7 | 0.8 |
| $C_{max}$ (dN · m) | 6.1 | 8.5 | 5.9 | 7.7 |
| ΔTorque (dN · m) | 5.3 | 7.7 | 5.2 | 6.9 |
| Reversion (1 or 3 hours at 150° C.) | | | | |
| $\Delta R_{60}$ (%) | −12 | −7 | −1 | −2 |
| $\Delta R_{180}$ (%) | −24 | −19 | +14 | +2 |
| Reversion (6 hours at 150° C.) | | | | |
| ΔME100 (%) | −27 | −15 | +26 | +1 |
| ΔME300 (%) | −33 | −18 | +36 | +6 |

What is claimed is:

1. A rubber composition usable for the manufacture of tires, based on at least one diene elastomer, at least one reinforcing filler, a vulcanization system and at least one maleimide compound, wherein said maleimide compound is a citraconimidomaleimide of the formula (R=radical consisting of carbon, hydrogen and optionally one or more heteroatoms selected from the group consisting of O, N and S):

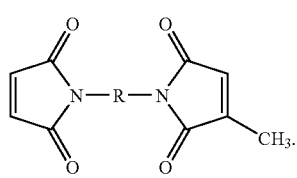

(I)

2. The composition according to claim 1, wherein R comprises from 1 to 25 carbon atoms, and optionally one or more heteroatom(s) selected from the group consisting of O, N and S.

3. The composition according to claim 2, wherein R is selected from the group consisting of alkylenes having from 1 to 20 carbon atoms, cycloalkylenes having from 6 to 24 carbon atoms, arylenes having from 6 to 18 carbon atoms and aralkylenes having from 7 to 25 carbon atoms.

4. The composition according to claim 3, wherein the citraconimidomaleimide is selected from the group consisting of N-(citraconimido-m-phenyl)maleimide, N-(citraconimido-p-phenyl)maleimide, N-(citraconimido-o-phenyl)maleimide, N-(3-citraconimido-4,6-dimethyl-phenyl)maleimide, N-(3-citraconimido-4-methyl-phenyl)maleimide, N-(3-citraconimido-6-methyl-phenyl)maleimide, N-(3-citraconimido-2-methyl-phenyl)maleimide, N-(1'-citraconimido-4,4'-methylene-bi-phenyl)maleimide, N-[2-(methylene-citraconimido)-phenyl]-methylene-maleimide, N-[3-(methylene-citraconimido)-phenyl]-methylene-maleimide, N-[4-(methylene-citraconimido)-phenyl]-methylene-maleimide, and mixtures of these compounds.

5. The composition according to claim 3, wherein R is a phenylene group.

6. The composition according to claim 5, wherein the citraconimidomaleimide is N-(p-citraconimidophenyl)-maleimide.

7. The composition according to claim 1, wherein the diene elastomer is selected from the group consisting of polybutadienes, natural rubber, synthetic polyisoprenes, butadiene copolymers, isoprene copolymers and mixtures of these elastomers.

8. The composition according to claim 1, wherein the reinforcing filler is present in an amount of between 20 and 200 phr (parts by weight to one hundred parts of diene elastomer).

9. The composition according to claim 8, wherein the reinforcing filler is present in an amount between 30 and 150 phr.

10. The composition according to claim 8, wherein the reinforcing filler is silica or carbon black.

11. The composition according to claim 7, wherein the diene elastomer is an isoprene elastomer.

12. The composition according to claim 1, wherein the amount of citraconimidomaleimide is between 0.1 and 10 phr.

13. The composition according to claim 12, wherein the amount of citraconimidomaleimide is within a range from 0.2 to 5 phr.

14. The composition according to claim 13, wherein the amount of citraconimidomaleimide is within a range from 0.2 to 2.5 phr.

15. The composition according to claim 1, which further comprises a primary vulcanization accelerator.

16. The composition according to claim 15, wherein the primary vulcanization accelerator is selected from the group consisting of 2-mercaptobenzothiazyl disuiphide, N-cyclohexyl-2-benzothiazyl sulphenamide, N,N-dicyclohexyl-2-benzothiazyl sulphenamide, N-tert.-butyl-2-benzothiazyl suiphenamide, N-tert.-butyl-2-benzothiazyl sulphenimide and mixtures of these compounds.

17. A process for preparing a rubber composition usable for the manufacture of tires and having an improved reversion resistance, this composition being based on at least one diene elastomer, at least one reinforcing filler and a vulcanization system, said process comprising:
incorporating in a diene elastomer, during a first step referred to as "non-productive", at least one reinforcing filler, by thermomechanically kneading the entire mixture, in one or more stages, until a maximum temperature of between 110° C. and 190° C. is reached;
cooling the entire mixture to a temperature of less than 100° C.;

then incorporating, during a second step referred to as "productive", the vulcanization system; and kneading the entire mixture until a maximum temperature of less than 110° C. is reached, wherein there is further incorporated, during any one of the steps of the process, at least one citraconimidomaleimide compound of the formula (I) (R=radical consisting of carbon, hydrogen and optionally one or more heteroatoms selected from the group consisting of O, N and S):

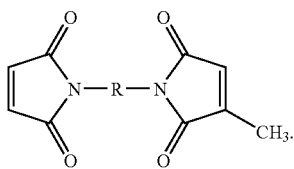

18. The process according to claim 17, wherein R comprises from 1 to 25 carbon atoms, and optionally one or more heteroatom(s) selected from the group consisting of O, N and S.

19. The process according to claim 18, wherein R is selected from the group consisting of alkylenes having from 1 to 20 carbon atoms, cycloalkylenes having from 6 to 24 carbon atoms, arylenes having from 6 to 18 carbon atoms and aralkylenes having from 7 to 25 carbon atoms.

20. The process according to claim 19, wherein the citracommidomaleimide is selected from the group consisting of N-(citraconimido-m-phenyl)maleimide, N-(citraconimido-p-phenyl)maleimide, N-(citraconimido-o-phenyl)maleimide, N-(3-citraconimido-4,6-dimethyl-phenyl)maleimide, N-(3-citraconimido-4-methyl-phenyl)maleimide, N-(3-citraconimido-6-methyl-phenyl)maleimide, N-(3-citraconimido-2-methyl-phenyl)maleimide, N-(1'-citraconimido-4,4'-methylene-bi-phenyl)maleimide, N-[2-(methylene-citraconimido)-phenyl]-methylene-maleimide, N-[3-(methylene-citraconimido)-Phenyl]-methylene-maleimide, N-[4-(methylene-citraconimido)-phenyl]-methylene-maleimide, and mixtures of these compounds.

21. The process according to claim 19, wherein R is a phenylene group.

22. The process according to claim 21, wherein the citraconimidomaleimide is N-(p-citraconimidophenyl)-maleimide.

23. The process according to claim 17, wherein the diene elastomer is selected from the group consisting of polybutadienes, natural rubber, synthetic polyisoprenes, butadiene copolymers, isoprene copolymers and mixtures of these elastomers.

24. The process according to claim 17, wherein the reinforcing filler is present in an amount between 20 and 200 phr (parts by weight to one hundred parts of diene elastomer).

25. The process according to claim 17, wherein the reinforcing filler is silica or carbon black.

26. The process according to claim 23, wherein the diene elastomer is an isoprene elastomer.

27. The process according to claim 17, wherein the amount of citraconimidomaleimide is between 0.1 and 10 phr.

28. The process according to claim 27, wherein the amount of citraconimidomaleimide is within a range from 0.2 to 5 phr.

29. The process according to claim 28, wherein the amount of citraconimidomaleimide is within a range from 0.2 to 2.5 phr.

30. The process according to claim 17, wherein the vulcanization system further comprises a primary vulcanization accelerator, selected from among the group consisting of 2-mercaptobenzothiazyl disulphide, N-cyclohexyl-2-benzothiazyl sulphenamide, N,N-dicyclohexyl-2-benzothiazyl suiphenamide, N-tert.-butyl-2-benzothiazyl suiphenamide, N-tert.-butyl-2-benzothiazyl sulphenimide and mixtures of these compounds.

31. The process according to claim 24, wherein the reinforcing filler is present in an amount between 30 and 150 phr.

32. A finished article or semi-finished product for a ground contact system of an automobile, comprising the composition according to claim 1.

* * * * *